(12) United States Patent
Duan

(10) Patent No.: US 12,551,275 B2
(45) Date of Patent: Feb. 17, 2026

(54) HAIR-REMOVAL APPARATUS

(71) Applicant: Shenzhen Yangwo Electronic Co., Ltd., Shenzhen (CN)

(72) Inventor: Dejin Duan, Shenzhen (CN)

(73) Assignee: SHENZHEN YANGWO ELECTRONIC CO., LTD., Shenzhen (CN)

( * ) Notice: Subject to any disclaimer, the term of this patent is extended or adjusted under 35 U.S.C. 154(b) by 442 days.

(21) Appl. No.: 18/170,565

(22) Filed: Feb. 17, 2023

(65) Prior Publication Data

US 2023/0210596 A1 Jul. 6, 2023

Related U.S. Application Data

(63) Continuation of application No. PCT/CN2020/133896, filed on Dec. 4, 2020.

(30) Foreign Application Priority Data

Aug. 19, 2020 (CN) .......................... 202010839726.X

(51) Int. Cl.
    *A61B 18/18*     (2006.01)
    *A61B 17/00*     (2006.01)
    *A61B 18/00*     (2006.01)

(52) U.S. Cl.
    CPC .... *A61B 18/18* (2013.01); *A61B 2017/00752* (2013.01); *A61B 2018/00017* (2013.01); *A61B 2018/1807* (2013.01)

(58) Field of Classification Search
None
See application file for complete search history.

(56) References Cited

U.S. PATENT DOCUMENTS

| 9,302,118 | B2 * | 4/2016 | Weckwerth | A61N 5/0616 |
| 2010/0196343 | A1 * | 8/2010 | O'Neil | A61Q 19/10 |
| | | | | 424/94.4 |
| 2010/0204695 | A1 * | 8/2010 | Mehta | A61B 18/1206 |
| | | | | 606/42 |

(Continued)

FOREIGN PATENT DOCUMENTS

| CN | 207804371 U | * | 9/2018 |
| CN | 209464502 U | | 10/2019 |

(Continued)

*Primary Examiner* — Carl H Layno
*Assistant Examiner* — Manolis Pahakis
(74) *Attorney, Agent, or Firm* — Andrew C. Cheng

(57) ABSTRACT

A hair-removal apparatus is provided, which includes a main body, a housing, a first air-inlet channel and a second air-inlet channel. The main body is accommodated in the housing and includes a heat-generating assembly and a refrigerating assembly. The first air-inlet channel communicates the refrigerating assembly with ambiance to absorb external air and dissipate heat from the refrigerating assembly, and the second air-inlet channel communicates the heat-generating assembly with ambiance to absorb external air and dissipate heat from the heat-generating assembly. The hair-removal apparatus is provided with two independent air inlet channels, which effectively enhances the heat dissipation performance of the hair-removal apparatus and improves the durability and safety of the hair-removal apparatus.

14 Claims, 7 Drawing Sheets

(56) References Cited

U.S. PATENT DOCUMENTS

| | | | | |
|---|---|---|---|---|
| 2010/0262135 A1* | 10/2010 | Berube | ............ | A61B 18/1477 606/33 |
| 2011/0098789 A1* | 4/2011 | Weckwerth | .......... | A61N 5/0616 607/88 |
| 2012/0197357 A1* | 8/2012 | Dewey | ................ | A61N 5/0616 607/89 |
| 2013/0060309 A1* | 3/2013 | Bradley | ................ | A61B 18/18 607/100 |
| 2013/0197495 A1* | 8/2013 | Koifman | ............ | A61B 18/203 606/17 |
| 2014/0200636 A1* | 7/2014 | Reichert | ............ | H01S 5/02476 438/22 |
| 2015/0209108 A1* | 7/2015 | Kim | .................... | A61B 18/203 606/9 |
| 2015/0282878 A1* | 10/2015 | Kindermann | ......... | A61B 18/18 606/9 |
| 2018/0117355 A1* | 5/2018 | Loupis | ................ | A61N 5/0616 |
| 2019/0167330 A1* | 6/2019 | Kim | ........................ | A61F 7/007 |
| 2019/0175396 A1* | 6/2019 | Kim | ........................ | A61M 5/422 |
| 2021/0393014 A1* | 12/2021 | Pan | .................... | A45D 26/0061 |
| 2022/0118278 A1* | 4/2022 | Pan | ........................ | A45D 26/00 |
| 2022/0192745 A1* | 6/2022 | Pan | ........................ | A61B 18/18 |
| 2025/0099778 A1* | 3/2025 | Zhou | ........................ | A61N 5/06 |

FOREIGN PATENT DOCUMENTS

| | | | | |
|---|---|---|---|---|
| CN | 209572304 U | 11/2019 | | |
| CN | 210872022 U | 6/2020 | | |
| CN | 111973884 A | 11/2020 | | |
| EP | 4190260 A1 | 6/2023 | | |
| GB | 2553575 A | * | 3/2018 | .......... A61N 5/0616 |
| JP | 3226132 U | 4/2020 | | |
| JP | 3227030 U | 7/2020 | | |
| WO | 2021027014 A1 | 2/2021 | | |

\* cited by examiner

HAIR-REMOVAL APPARATUS

CROSS-REFERENCE TO RELATED APPLICATIONS

This application claims priority to Chinese Patent Application No. 202010839726.X, the disclosure of which is hereby incorporated by reference in its entireties. This application is also a continuation of International Application No. PCT/CN2020/133896 filed on Dec. 4, 2020.

TECHNICAL FIELD

The present disclosure relates generally to the technical field of hair-removal devices, and more particularly to a hair-removal apparatus.

BACKGROUND

Hair-removal devices are comfortable, safe and fashionable household apparatuses that adopts advanced optical hair removal to effectively prevent the regrowth of hair on various parts of the body and remove hair permanently.

In the existing art, a heat-dissipating mechanism is usually provided inside the hair-removal device, therefore the heat dissipation performance thereof will directly affect the cold-compress effect and the durability of the hair-removal device. However, the heat dissipation performance of the heat-dissipating mechanism in traditional hair-removal devices is not good, which reduces the durability thereof. Although some hair-removal devices on the market are provided with an independent air-inlet channel, the air intake volume through a single air-inlet channel is difficult to meet the heat dissipation requirements of the internal mechanisms of the hair-removal device, and due to the structure of the heat-dissipating mechanism, the heat of the components inside the hair-removal device that need to be dissipated cannot be dissipated timely, leading to a low heat dissipation performance.

To solve the problems above, it is urgent to provide a new type of hair-removal device.

SUMMARY

To solve the problems in the existing art that only one air-inlet channel is provided in traditional hair-removal devices, the air inlet volume of the air-inlet channel is limited and the heat dissipation efficiency is low, a hair-removal apparatus is provided.

To solve the problems above, an embodiment of the present disclosure provides a hair-removal apparatus, which includes a housing, a main body accommodated in the housing, a first air-inlet channel and a second air-inlet channel. The main body includes a heat-generating assembly and a refrigerating assembly. The first air-inlet channel and the second air-inlet channel respectively communicate the refrigerating assembly and the heat-generating assembly with ambiance to absorb external air and dissipate heat thereof.

Compared with the existing art, the hair-removal apparatus of the present disclosure has the following beneficial effects:

The hair-removal apparatus includes two independent air-inlet channels constructed by disposing two independent air inlets on the fan housing to absorb external air and dissipate heat from the refrigerating assembly and the heat-generating assembly simultaneously, which solves the problem of inability to take the heat dissipation of multiple heating components simultaneously into account. Therefore the heat dissipation performance of the hair-removal apparatus is enhanced, and the durability and safety of the hair-removal apparatus are improved. A fast-flowing airflow is formed via the rotation of the fan in the fan housing, and the flowing airflow flows in via the first air-inlet channel and the second air-inlet channel respectively, such that the air volume entering the internal mechanism of the hair-removal apparatus per unit time is greatly increased. Powerful and sufficient airflow can take away the heat of the heat-generating assembly and the refrigerating assembly inside the hair-removal apparatus timely, and dissipate heat via the air-outlet hole on the second housing of the hair-removal apparatus, which further improves the heat dissipation performance of the hair-removal apparatus. Further, the first air-inlet channel and the second air-inlet channel are independent of each other. The airflow passing through the first air-inlet channel will take away the heat of the refrigerating assembly disposed to the first air inlet, which accelerates the refrigeration of the refrigerating assembly, such that the heat of the heat-conducting substrate and the refrigerating sheet connected to the refrigerating assembly can be dissipated timely, so as to improve the refrigeration efficiency of the refrigerating sheet. The icing effect of the hair-removal apparatus is better when in use, and the user experience is thus improved. In addition, external air sucked into the second air-inlet channel will pass through the heat-generating assembly and take away the heat of the heat-generating assembly and the heat-dissipating member, which accelerates the refrigeration of the heat-generating assembly and the heat-dissipating member. Understandably, the independent first air-inlet channel and the second air-inlet channel respectively dissipate heat via the flowing air flow in different portions of the hair-removal apparatus, such that the heat of each component inside the hair-removal apparatus can be promptly dissipated, which further improves the heat dissipation performance of the hair-removal apparatus, greatly improves the durability of the hair-removal apparatus and makes it more convenient to use. Furthermore, due to the improvement of the heat dissipation performance of the hair-removal device, the working temperature of the hair-removal device is lowered, and the user experience will not be affected because the hair-removal device is hot when in use.

NUMERICAL REFERENCE IDENTIFICATION

Figure 1:
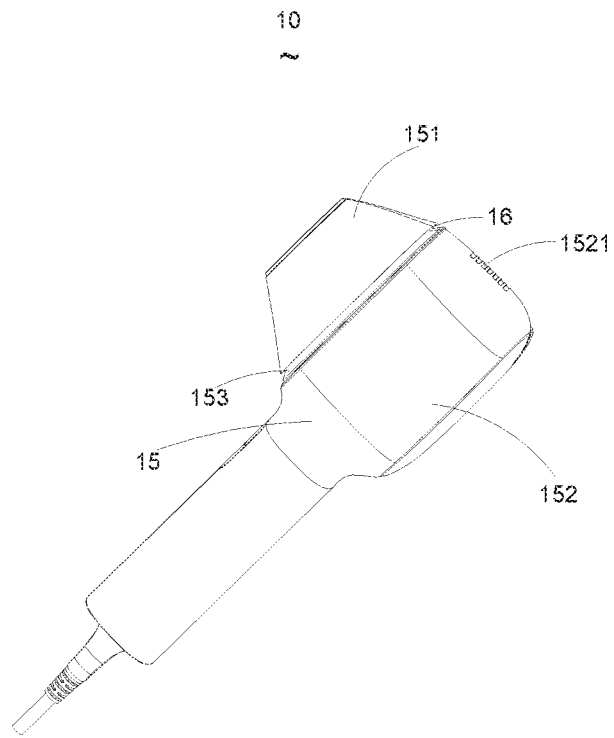
FIG. 1 is a schematic diagram 1 of an overall structure of a hair-removal apparatus according to a first embodiment.
Figure 2:
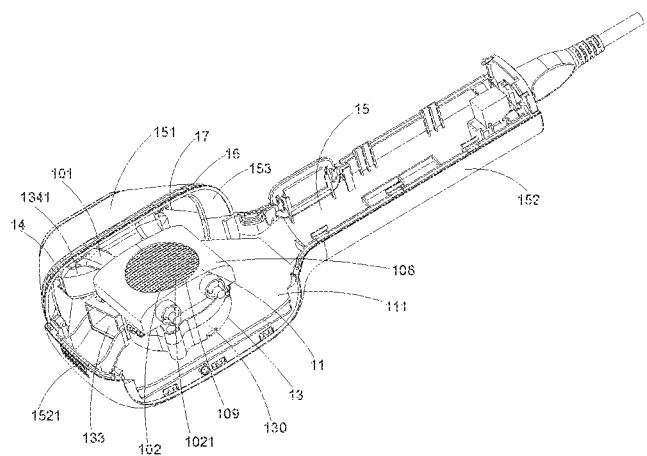
FIG. 2 is a schematic diagram of the internal structure of the hair-removal apparatus according to the first embodiment.
Figure 3:
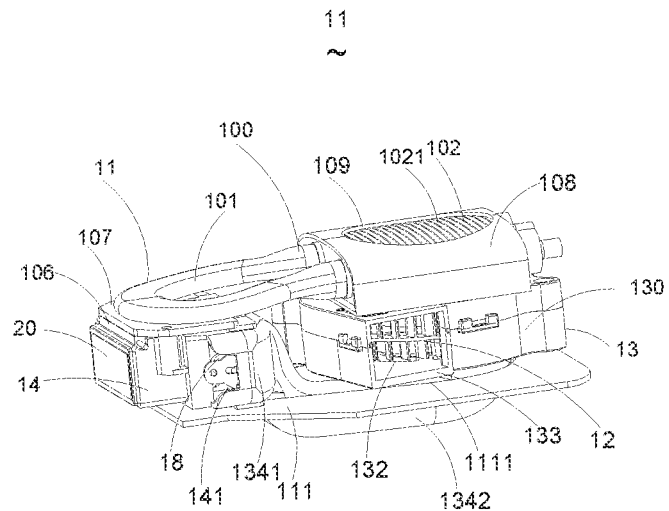
FIG. 3 is a schematic diagram of the overall structure of the main body of the hair-removal apparatus according to the first embodiment.

First embodiment: 10. hair-removal apparatus; 11. main body; 111. circuit-board assembly; 1111. limiting hole; 12. fan; 13. fan housing; 14. heat-dissipating housing; 130. fan casing; 131. first air inlet; 132. second air inlet; 133. air outlet; 134. air-guiding mechanism; 135. mounting plate; 1341. air-guiding groove; 1342. drop-shaped housing; 1343. vent; 100. refrigerating assembly; 101. heat pipe; 102. heat-dissipating sheet; 181. lamp; 182. reflective cup; 104. heat-dissipating member; 1041. sheet-like structure; 1042. heat-dissipating gap; 106. refrigerating sheet; 1061. refrigerating surface; 1062. heat-generating surface; 107. heat-conducting substrate; 108. air-sucking hood; 109. air-restricting through hole; 141. air-entering hole; 15. housing; 151. first housing; 152. second housing; 153. annular housing; 16. air-entering gap; 1021. air-passing gap; 1521. air-outlet hole; 1522. air-inlet hole; 17. air-inlet chamber; 18. heat-generating assembly; 19. air-passing chamber; 20. light-transmitting crystal; 21. silica-gel sealing ring; 22. filter lens; 23. light-shielding sheet; 24. sealing cavity.

Second embodiment: 10a. hair-removal apparatus; 11a. main body; 15a. housing; 151a. first housing; 152a. second housing; 153a. annular housing; 1521a. air-outlet hole; 1522a. air-inlet hole; 16a. air-inlet grid.

Third embodiment: 10b. hair-removal apparatus; 11b. main body; 15b. housing; 151b. first housing; 152b. second housing; 153b. third housing; 1521b. air-outlet hole; 1522b. air-inlet hole; 16b. air-entering hole.

Fourth embodiment: c. fan assembly; 12c. fan; 1.3c. fan housing; 1.21c. motor; 1211c. shaft; 122c. first fan blade; 1221c. first blade; 123c. second fan blade; 1231c. second blade; 130c. fan casing; 131c. first air inlet; 132c. second air inlet; 133c. first air outlet; 134c. second air outlet; 135c. isolation plate mechanism; 1351c. motor-installing slot; 136c. first air chamber; 137c. second air chamber.

DETAILED DESCRIPTION

In order to make the objectives, technical solutions, and advantages of the present disclosure clearer, the present disclosure is further described in detail below with reference to the accompanying drawings and embodiments. It is noted that the specific embodiments described herein are provided for illustration only, and not to limit the present disclosure.

Referring to FIG. 1 to FIG. 9, a hair-removal apparatus 10 is provided, according to a first embodiment. The hair-removal apparatus 10 includes a main body 11. The main body 11 includes a fan 12, a fan housing 13, a light-transmitting crystal 20, a refrigerating assembly 100 and a heat-generating assembly 18. The fan housing 13 includes a fan casing 130, which is provided with a first air inlet on a side thereof, at least one second air inlet 132 on the opposite side of the first air inlet 131 and an air outlet 133 on the peripheral side thereof. The refrigerating assembly 100 is connected to the light-transmitting crystal 20 and is disposed at the first air inlet 131. Air is circulated between the heat-generating assembly 18 and the second air inlet 132. The fan 12 disposed in the fan casing 130 rotates to suck air, and external air is sucked into the fan casing 130 respectively from the first air inlet 131 and the second air inlet 132 and discharged from the air outlet 133. The fan housing 13 further includes an air-guiding mechanism 134 that has a structure of both ends in communication with each other, a narrow middle and two wide ends. The main body 11 further includes a heat-dissipating housing 14. An end of the air-guiding mechanism 134 is connected to the second air inlet 132, and the other end thereof is connected to the heat-dissipating housing 14 to define an air-passing chamber 19. The heat-generating assembly 18 is disposed in the air-passing chamber 19.

Specifically, a first air-inlet channel is defined by the air-inlet hole 1522, the refrigerating assembly 100 and the fan housing 13 jointly, so as to make external air being sucked into the fan housing 13 therethrough and reduce the temperature of the refrigerating assembly 100. A second air-inlet channel is defined by the air-entering hole 141, the heat-generating assembly 18 and the fan housing 13 jointly, so as to make external air being sucked into the fan housing 13 therethrough and reduce the temperature of the heat-generating assembly 18. The first air inlet 131 and the second air inlet 132 disposed on the fan casing 130 are communicated sequentially, such that the air intake of the first air-inlet channel is smoother, so as to absorb external air and dissipate heat of the refrigerating assembly 100 disposed at the first air inlet 131. At least one air-entering hole 141 is defined on the heat-dissipating housing 14. The air-entering hole 141 defined on the heat-dissipating housing 14, the air-guiding mechanism 134, and the second air inlet 132 disposed on the fan casing 130 are communicated sequentially, such that the air intake of the first air-inlet channel is smoother, so as to absorb external air and dissipate heat of the heat-generating assembly 18 in the air-passing chamber 19. Understandably, by defining two independent air inlets on the fan casing 130 to construct two independent air inlet channels to absorb external air and dissipate heat from the refrigerating assembly 100 and the heat-generating assembly 18 simultaneously, the problem of inability to take the heat dissipation of multiple heating components simultaneously into account is solved, the heat dissipation performance of the hair-removal apparatus 10 is enhanced, and the durability and safety thereof are improved. A fast-flowing airflow is formed via the rotation of the fan 12 in the fan housing 13, and the flowing airflow flows in through the first air-inlet channel and the second air-inlet channel respectively, such that the air volume entering the internal mechanism of the hair-removal apparatus 10 per unit time is greatly increased. Strong and sufficient flowing airflow can timely take away the heat of the heat-generating assembly 18 and the refrigerating assembly 100 inside the hair-removal apparatus 10, which further improves the heat dissipation performance of the hair-removal apparatus 10.

Further, the hair-removal apparatus 10 may dissipate heat of the heat-generating assembly 18 and the refrigerating assembly 100 by sucking air. External air of normal temperature sucked into via the rotation of the fan 12 first passes through the heat-generating assembly 18 and the refrigerating assembly 100 respectively to dissipate heat thereof. Subsequently, air that has absorbed the heat is sucked into the fan housing 13 and is finally discharged from the housing 15 of the hair-removal apparatus 10 via the fan 12. The traditional blowing and heat dissipation is to form high-speed airflow via the rotation of the fan 12 to blow high-heat components to dissipate heat. However, high-speed airflow will form high-heat airflow while taking away the heat of high-heat components. High-heat air blowing on a certain local area inside the hair-removal apparatus 10 for a long time will cause the temperature of the area to rise sharply and eventually lead to overheating and damage to the components in the area. In the air suction and heat dissipation of the present disclosure, the high-heat airflow passing through the high-heat components (i.e. the heat-generating assembly 18 and the refrigerating assembly 100) is directly sucked into the fan housing 13 via the fan 12, such that the high-heat airflow will not dwell too much in the internal structures of the hair-removal apparatus 10. Further, due to the unique structure of the fan housing 13, the high-heat airflow flowing through the second air-inlet channel is concentrated in the air-guiding mechanism 134 (i.e., the air-guiding mechanism 134 limits the flowing direction of high-heat airflow). Since there are no important vulnerable components near the air-guiding mechanism 134, even if the temperature increases, the components nearby will not be damaged. Understandably, compared with the traditional method of blowing to dissipate heat, the heat dissipation of air suction via the fan 12 solves the problem that the heat is easily concentrated to cause the temperature in a certain local area to be too high, resulting in overheating and damage to the components inside the hair-removal apparatus 10, which further improves the durability and safety of the hair-removal apparatus 10.

Figure 4:
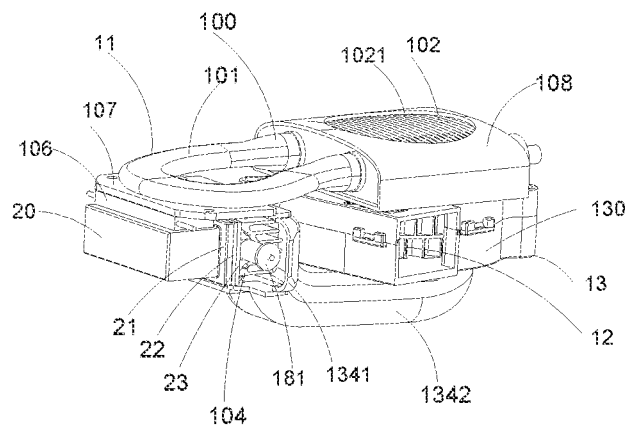
FIG. 4 is a schematic diagram of a partial structure of the main body of the hair-removal apparatus according to the first embodiment.
Figure 5:
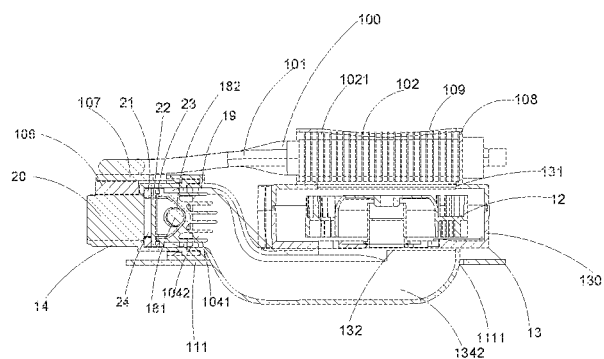
FIG. 5 is a cross-sectional view of the main body of the hair-removal apparatus according to the first embodiment.

Referring to FIG. 4 and FIG. 5, the main body 11 further includes a filter lens 22, a light-shielding sheet 23 and a heat-dissipating member 104. The light-transmitting crystal 20, the filter lens 22, the light-shielding sheet 23, the heat-generating assembly 18 and the heat-dissipating member 104 are sequentially stacked and compactly arranged in the heat-dissipating housing 14. A silica-gel sealing ring 21 is disposed between the light-transmitting crystal 20 and the filter lens 22 to define a sealing cavity 24. By sequentially stacked and compactly arranged the light-transmitting crystal 20, the filter lens 22, the light-shielding sheet 23, the heat-generating assembly 18 and the heat-dissipating member 104 in the heat-dissipating housing 14 sequentially, the stability of the internal portions of the hair-removal apparatus 10 is effectively enhanced, such that the failure of the hair-removal apparatus 10 due to loose internal portions during use can be prevented and the safety of the hair-removal apparatus 10 can be improved. In addition, by disposing the silica-gel sealing ring 21 for sealing between the light-transmitting crystal 20 and the filter lens 22, the light-transmitting crystal 20, the silica-gel sealing ring 21 and the filter lens 22 form the airtight sealing cavity 24, in the process of pressing and installing, air in the sealing cavity 24 is squeezed out, such that a vacuum can be formed between the light-transmitting crystal 20 and the filter lens 22, and the problem that air between the filter lens 22 and the light-transmitting crystal 20 is condensed to form water droplets causing electric shock to human body can be prevented, which further improves the safety performance of the hair-removal apparatus 10.

Optionally, the light-transmitting crystal 20 is made of sapphire, and the main component thereof is aluminum oxide. It is well known that sapphire has the advantages of high-heat transfer coefficient and high-light transmittance. Due to the high-heat transfer coefficient of sapphire, the light-transmitting crystal 20 made of sapphire has excellent cold-conducting and cold-storing properties. The light-transmitting crystal 20 is refrigerated by a refrigerating sheet 106, and the light-transmitting crystal 20 made of sapphire can effectively ice the user's skin by its excellent cold-conducting and cold-storing properties, so as to relieve pain and burning sensation of the skin when removing hair, and the user experience with is thus optimized.

Referring to FIG. 4 and FIG. 5, the heat-generating assembly 18 includes a lamp 181 and a reflective cup 182, and the lamp 181 is disposed in the reflective cup 182. The heat-dissipating member 104 is connected to the reflective cup 182. The refrigerating assembly 100 includes a heat pipe 101 and a heat-dissipating sheet assembly that includes at least two spaced heat-dissipating sheets 102, and the heat-dissipating sheet assembly is sleeved on the heat pipe 101. The refrigerating assembly 100 further includes a heat-conducting substrate 107. The heat-conducting substrate 107 is positioned on the heat-dissipating housing 14, and the heat pipe 101 is connected to the heat-conducting substrate 107. The refrigerating sheet 106 includes a refrigerating surface 1061 and a heat-generating surface 1062 that is in close contact with the heat-conducting substrate 107, and the refrigerating surface 1061 is connected to the light-transmitting crystal. The refrigerating sheet 106 is embedded in the heat-dissipating housing 14.

Optionally, the main body 11 further includes a circuit-board assembly 111 connected to the fan housing 13. The circuit-board assembly 111 defines a limiting hole 1111, and an end of the fan housing 13 away from the refrigerating assembly 100 is disposed in the limiting hole 1111. Thus, the internal structure of the hair-removal apparatus 10 is further optimized, more internal space is saved, and the overall volume of the hair-removal apparatus 10 can be reduced.

Specifically, the first air-inlet channel and the second air-inlet channel are independent of each other. Airflow passing through the first air-inlet channel will take away the heat of the refrigerating assembly 100 disposed at the first air inlet 131, which accelerates the refrigeration of the refrigerating assembly 100, such that the heat of the heat-conducting substrate 107 and the refrigerating sheet 106 connected to the refrigerating assembly 100 is promptly conducted to improve the refrigerating efficiency of the refrigerating sheet 106, the hair-removal apparatus 10 has a better icing effect when in use, and the user experience is improved. In addition, external air sucked into the second air-inlet channel will pass through the heat-generating assembly 18 and take away the heat of the heat-generating assembly 18 and the heat-dissipating member 104, thereby accelerating the refrigeration of the heat-generating assembly 18 and the heat-dissipating member 104. Understandably, the first air-inlet channel and the second air-inlet channel, which are independent of each other, respectively dissipate heat from different portions of the hair-removal apparatus 10 via the flowing airflow, such that the heat in each component inside the hair-removal apparatus 10 can be dissipated timely, which further improves the heat dissipation performance of the hair-removal apparatus 10 and the durability of the hair-removal apparatus 10, and the use is more convenient. Further, since the heat dissipation performance of the hair-removal apparatus 10 is improved, the working temperature of the hair-removal apparatus 10 is reduced, and the user experience will not be affected by the fact that the hair-removal apparatus 10 is hot when using the hair-removal apparatus 10.

Referring to FIG. 4 again, the heat pipe 101 is connected to the refrigerating sheet 106 via the heat-conducting substrate 107 that is made of a material capable of conducting heat. The heat-conducting substrate 107 can transfer the heat generated by the heat-generating surface 1062 of the refrigerating sheet 106 to the heat pipe 101 by means of contact to dissipate heat, and heat generated by the heat-generating surface 1062 of the refrigerating sheet 106 can be absorbed by the heat pipe 101 more timely to improve the refrigerating efficiency of the refrigerating surface 1061 of the refrigerating sheet 106. By disposing the refrigerating assembly 100 at the first air inlet 131, the heat of the heat pipe 101 and heat-dissipating sheet 102 can be absorbed by air and then discharged from the hair-removal apparatus 10 timely via the rotation and suction of the fan 12, which improves the refrigerating efficiency of the refrigerating assembly 100 and effectively prevents the heat-generating assembly 18 from overheating and affecting the normal operation of the hair-removal apparatus 10, further enhancing the stability of the hair-removal apparatus 10.

Referring to FIG. 4 and FIG. 5 again, the heat-dissipating member 104 connected to the heat-generating assembly 18 is provided with a plurality of sheet-like structures 1041. The heat generated by the heat-generating assembly 18 is conducted to the heat-dissipating member 104, and each two adjacent sheet-like structures 1041 of the heat-dissipating member 104 defines a heat-dissipating gap 1042. The heat-dissipating gaps 1042 can effectively increase the contact area between the heat-dissipating member 104 and air, such that the heat of the heat-dissipating member 104 can be efficiently absorbed by air, and the heat dissipation performance of the heat-dissipating member 104 is improved. Similarly, the heat pipe 101 is provided with at least two spaced heat-dissipating sheets 102 (i.e. heat-dissipating sheet assembly), and each two adjacent heat-dissipating sheets 102 defines an air-passing gap 1021. The air-passing gaps 1021 between the heat-dissipating sheets 102 also increase the contact area between the heat-dissipating sheets 102 and air, such that the heat transferred by the heat pipe 101 to the heat-dissipating sheet 102 can be absorbed by air timely, and the heat dissipation performance of the heat pipe 101 is improved, such that the transfer efficiency of the heat generated by the heat-generating surface 1062 of the refrigerating sheet 106 is improved, the refrigerating effect of the refrigerating sheet 106 is improved, and the practicality of the hair-removal apparatus 10 is enhanced.

Figure 6:
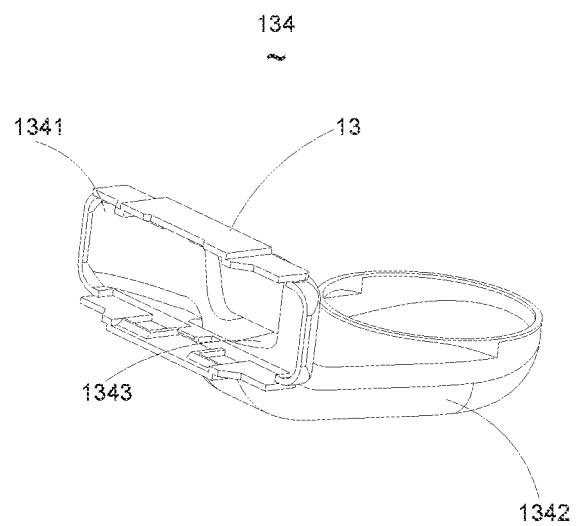
FIG. 6 is a schematic diagram of the overall structure of the air-guiding mechanism of the hair-removal apparatus according to the first embodiment.
Figure 7:
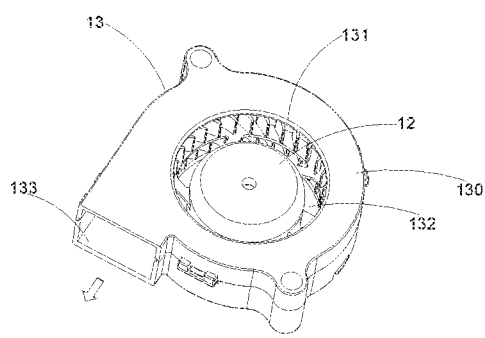
FIG. 7 is a schematic diagram 1 of the structure of the fan and the fan housing of the hair-removal apparatus according to the first embodiment.
Figure 7A:
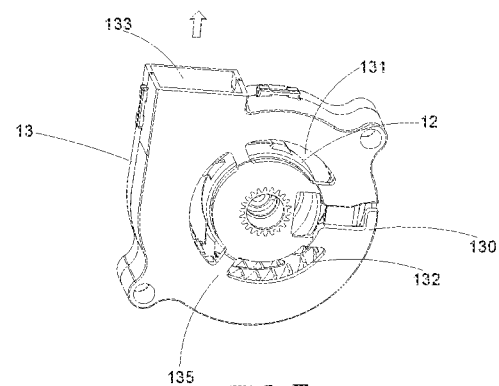
FIG. 7a is a schematic diagram 2 of the structure of the fan and the fan housing of the hair-removal apparatus according to the first embodiment.
Figure 8:
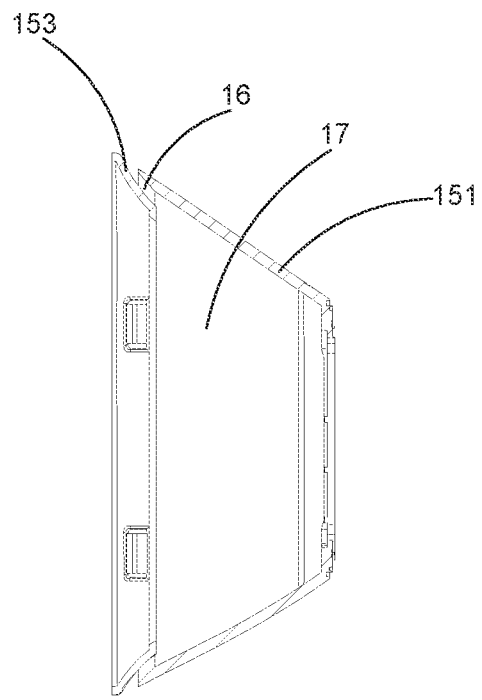
FIG. 8 is a cross-sectional view of the first housing and the annular housing of the hair-removal apparatus according to the first embodiment.

Referring to FIG. 5 and FIG. 6, an end of the air-guiding mechanism 134 is provided with an air-guiding groove 1341, and the other end thereof is provided with a flat drop-shaped housing 1342. The air-guiding mechanism 134 has a structure of a narrow middle and two wide ends, and the air-guiding groove 1341 includes a long groove and a neck-shaped airway (i.e. a central-gathering structure). An end of the neck-shaped airway is connected to the air-guiding groove 1341, and the other end thereof is connected to the drop-shaped housing 1342, and a vent 1343 is provided at the position where the long groove and the neck-shaped airway are connected. Air flows into the air-entering hole 141 via the rotation of the fan 12, and passes through the heat-generating assembly 18 and the heat-dissipating member 104 to take away the heat thereof. Air flowing through the heat-generating assembly 18 and the heat-dissipating member 104 will be preferentially sprayed to the bottom of the long groove when entering the long groove. The flowing direction of airflow is changed by the suction force generated by the rotation of the fan 12 from the air vent, thereby generating a high-speed air flow that flows in the direction of the bottom of the long groove and converges at the air vent. The high-speed airflow finally gathers at the vent 1343 and flows into the drop-shaped housing 1342 through the neck-shaped airway, that is, the heat of the heat-generating assembly 18 in the air-passing chamber 19 is dissipated, and the function of heat dissipation is realized. Understandably, the high-speed airflow flowing in the direction of the bottom of the long groove effectively prolongs the contact time of air with the heat-generating assembly 18 and the heat-dissipating member 104, such that air has enough time to fully absorb the heat thereof. Moreover, by making the airflow pass through the bottom of the air-guiding groove 1341 to extend the airflow path, compared with the solution of extending the airflow path by extending the air duct in the existing art, the internal space of the hair-removal apparatus 10 is saved, the volume of the hair-removal apparatus 10 is reduced and the internal space can be arranged better. Meanwhile, the contact time between the airflow and the heating elements is prolonged, which further enhances the heat dissipation performance of the hair-removal apparatus 10.

Referring to FIG. 4 to FIG. 7a, since the heat of the refrigerating assembly 100 is generally higher than that of the heat-generating assembly 18, targeted heat dissipation is required. The cross-sectional area of the first air inlet 131 disposed on the fan casing 130 is larger than that of the second air inlet 132, such that the fan 12 can suck air from the first air inlet 131 more efficiently than the second air inlet 131. Therefore, the heat dissipation efficiency of the refrigerating assembly 100 disposed at the first air inlet 131 is higher, such that the heat of the refrigerating assembly 100 is preferentially dissipated. Understandably, the air suction efficiency of the first air-inlet channel that takes air from the first air inlet 131 is higher than that of the second air-inlet channel that takes air from the second air inlet 132. That is, the first air-inlet channel is the main air inlet channel, which is mainly configured to absorb external air and dissipate heat from the refrigerating assembly 100 with high heat, while the second air-inlet channel is the auxiliary air inlet channel, which is mainly configured to absorb external air and dissipate heat from the heat-generating assembly 18. The two air inlet channels are not the same and independent of each other.

Optionally, the fan casing 130 further includes a mounting plate 135 with the second air inlet 132 defined thereon. That is, the second air inlet 132 may be an air inlet defined by a plurality of small holes for air intake.

As a variant embodiment, the cross-sectional area of the first air inlet 131 disposed on the fan casing 130 may be equal to that of the second air inlet 132. That is, the efficiency of the fan 12 sucking air from the first air inlet 131 is equal to that of the fan 12 sucking air from the second air inlet 131, such that the heat of the refrigerating assembly 100 and the heat-generating assembly 18 can be dissipated with high efficiency simultaneously.

Referring to FIG. 7 to FIG. 11, the hair-removal apparatus 10 of the first embodiment further includes a housing 15, and the main body 11 is accommodated therein. The housing 15 includes a first housing 151, a second housing 152 and an annular housing 153. The first housing 151 is clamped to the heat-dissipating housing 14, and the annular housing 153 is connected to the second housing 152. An air-entering gap 16 for air intake is defined between the first housing 151 and the annular housing 153. The first housing 151 and the annular housing 153 jointly define an air-inlet chamber 17 with the air-entering hole 141 disposed therein, and the air-inlet chamber 17 is communicated with the air-passing chamber 19 via the air-entering hole 141. An air-outlet hole 1521 corresponding to the air outlet 133 is defined at the second housing 152, and external air sucked into the hair-removal apparatus 10 is finally discharged from the air-outlet hole 1521.

Specifically, an air-inlet hole 1522 for air intake is defined at the second housing 152 corresponding to the first air inlet 131. External air can be sucked into the air-inlet hole 1522 and the air-entering gap 16 simultaneously, which increases the air intake volume and improves the heat dissipation performance. External air is sucked into the hair-removal apparatus 10 via the air-entering gap 16 and the air-inlet hole 1522, and finally airflow formed by hot air is blown out from the air outlet 133 on the fan casing 130 and passes through the air-outlet hole 1521 on the housing 15 and is discharged out of the hair-removal apparatus 10. Understandably, external air is sucked into the hair-removal apparatus 10 from the air-entering gap 16 and the air-inlet hole 1522 via the rotation of the fan 12, and air flows between the internal mechanisms of the hair-removal apparatus 10 to absorb the heat thereof, and is finally discharged from the air-outlet hole 1521 on the second housing 152. Thus, air circulation and heat dissipation of the hair-removal apparatus 10 is realized, the components in the hair-removal apparatus 10 can be effectively prevented from being damaged due to overheating, the durability of the hair-removal apparatus 10 is enhanced, and the practicality of the hair-removal apparatus 10 is enhanced. Further, external air sucked by the air-entering gap 16 is blown along the direction of the inner wall of the first housing 151, and constant airflow can take away the heat of the first housing 151 and the air-inlet chamber 17 timely. Thus the temperature of the first housing 151 tends to be stable and not overheated, which solves the problem of discomfort caused by the skin of the user contacting the overheated first housing 151, and effectively optimizes the hair removal experience.

Optionally, the second housing 152 and the annular housing 153 are integrally formed, or may be detachably connected and independent of each other.

As a variant embodiment, the housing 15 includes a first housing 151, a second housing 152 and an annular housing 153, which are integrally formed. The first housing 151 and/or the second housing 152 are provided with an air-inlet through hole communicated with the air-inlet chamber 17 via the air-entering hole 141, and external air is sucked into the air-inlet chamber 17 via the air-inlet through hole and the air-entering hole 141 sequentially. Understandably, the positions of the air-inlet through hole can be flexibly disposed according to actual needs, as long as the air-inlet through hole is communicated with the air-inlet chamber 17. The advantage of this arrangement mainly lies in its flexibility. Manufacturers can adjust the position and shape of the air-inlet through hole according to the needs of customers to meet the aesthetics of different customers.

Figure 9:
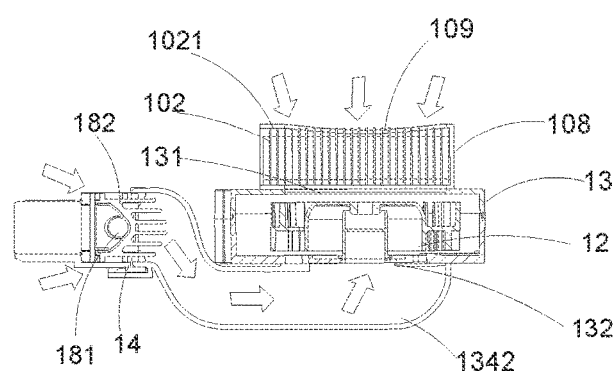
FIG. 9 is a schematic diagram 1 of the airflow direction of the internal air duct of the hair-removal apparatus according to the first embodiment.
Figure 10:
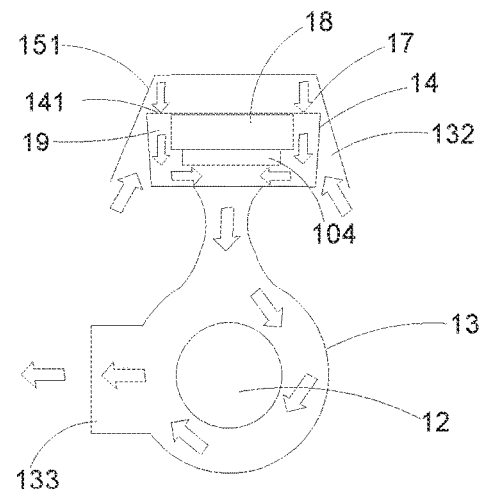
FIG. 10 is a schematic diagram 2 of the airflow direction of the internal air duct of the hair-removal apparatus according to the first embodiment.

Referring to FIG. 4 and FIG. 9, an air-sucking hood 108 is sleeved on the peripheral side of the heat-dissipating sheet assembly. The air-sucking hood 108 is provided with an air-restricting through hole 109 corresponding to the air-inlet hole 1522, and the air-restricting through hole 109 is communicated with the air-inlet hole 1522 and the first air inlet 131 respectively. Further, the heat-dissipating sheet 102 is isolated from the internal space of the hair-removal apparatus 10 by the peripheral side of the air-sucking hood 108. The air-restricting through hole 109 runs through the air-sucking hood 108 and includes two openings that are oppositely disposed. One of the openings is disposed corresponding to the air-inlet hole 1522, and the other is disposed corresponding to the first air inlet 131. Understandably, when the fan 12 rotates to suck air, since the peripheral side of the air-sucking hood 108 isolates the heat-dissipating sheet 102 from the internal space of the hair-removal apparatus 10, only normal temperature air outside the hair-removal device 10 can be sucked into, and hot air inside the hair-removal apparatus 10 will not be sucked into the air-sucking hood 108, which improves the heat dissipation efficiency and effectively solves the problem of overheating of internal components caused by hot air circulation. Further, external air is first sucked into the air-sucking hood 108 via the opening of the air-restricting through hole 109 corresponding to the air-inlet hole 1522 to dissipate heat of the heat-dissipating sheet 102. Subsequently, external air that has absorbed the heat is sucked into the fan housing 13 via the first air inlet 131 from the opening of the air-restricting through hole 109 corresponding to the first air inlet 131 to realize heat dissipation.

Optionally, the refrigerating assembly 100 is disposed between the air-inlet hole 1522 and the fan housing 13, such that the fan 12 can dissipate the heat of the refrigerating assembly 100 timely when the fan 12 rotates to suck air. That is, air suction and heat dissipation are smoother.

Figure 11:
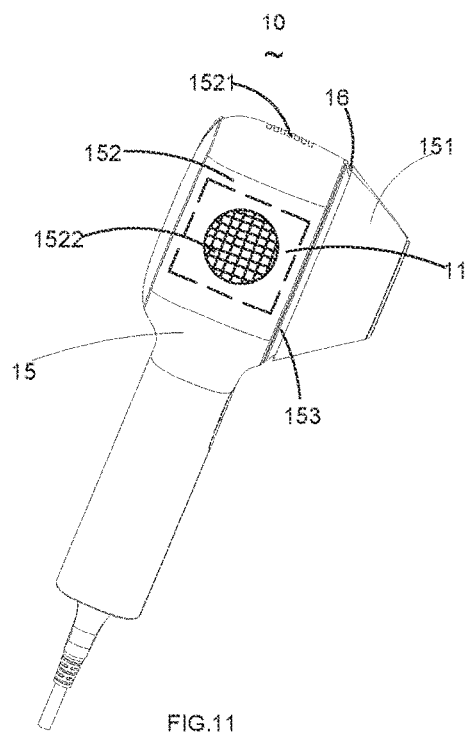
FIG. 11 is a schematic diagram 2 of the overall structure of the hair-removal apparatus according to the first embodiment.
Figure 11A:
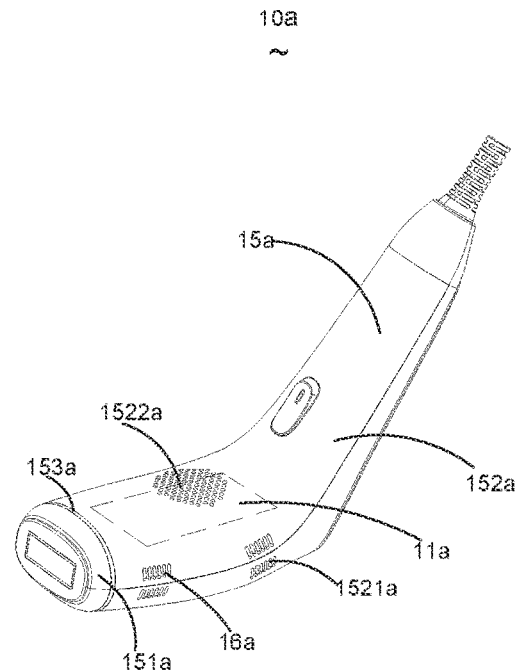
FIG. 11a is a schematic diagram of the overall structure of the hair-removal apparatus according to a second embodiment.

Referring to FIG. 11a, a hair-removal apparatus 10a is provided, according to a second embodiment. The hair-removal apparatus 10a includes a housing 15a and a main body 11a accommodated in the housing 15a for hair removal and heat dissipation. The structure and principle of the main body 11a are the same as the main body 11 of the first embodiment. The main body 11a is accommodated in the housing 15a. The housing 15a includes a first housing 151a, a second housing 152a and an annular housing 153a. The first housing 151a is detachably connected to the annular housing 153a, and the second housing 152a is detachably connected to or integrally formed with the annular housing 153a. An air-inlet grid 16a for air intake and an air-outlet hole 1521a for air outlet are defined on the peripheral side of the second housing 152a. An air-inlet hole 1522a for air intake is defined on the second housing 152a. External air is sucked into via the air-inlet hole 1522a and the air-inlet grid 16a simultaneously to dissipate heat from the heating mechanism in the main body 11a, thereby improving the air intake efficiency of the main body 11a. Subsequently, the main body 11a discharges hot air from the air-outlet hole 1521a out of the housing 15a to promptly dissipate heat. Further, the housing 15a of the hair-removal apparatus 10a has an L-shaped crank-shaped structure, which is small in size and convenient for users to hold.

Figure 11B:
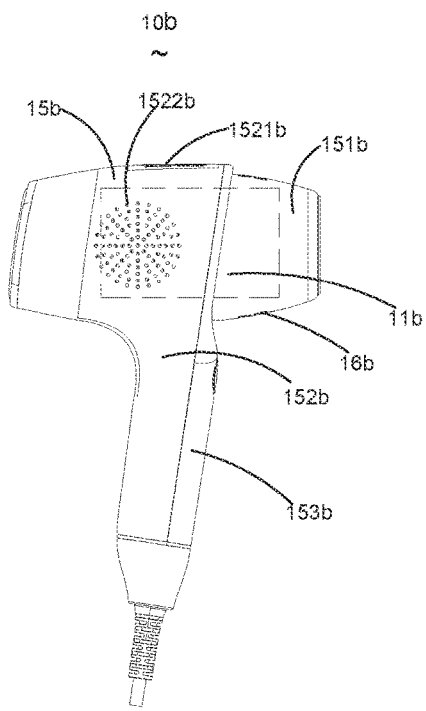
FIG. 11b is a schematic diagram of the overall structure of the hair-removal apparatus according to a third embodiment.
Figure 12:
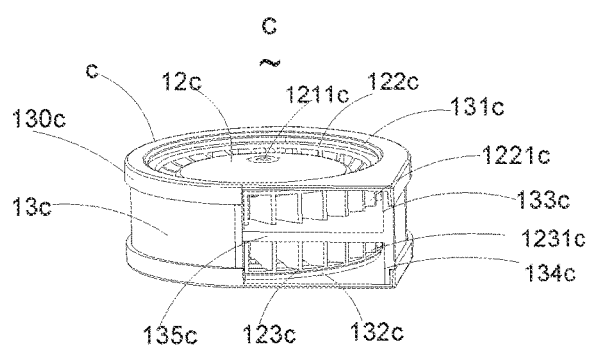
FIG. 12 is a schematic diagram of the overall structure of the fan assembly according to a fourth embodiment.
Figure 12A:
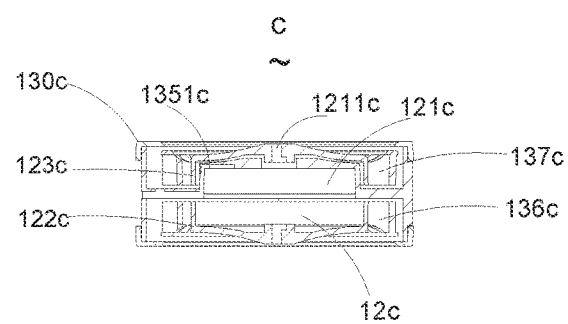
FIG. 12a is a cross-sectional view of a fan assembly according to the fourth embodiment.
Figure 13:
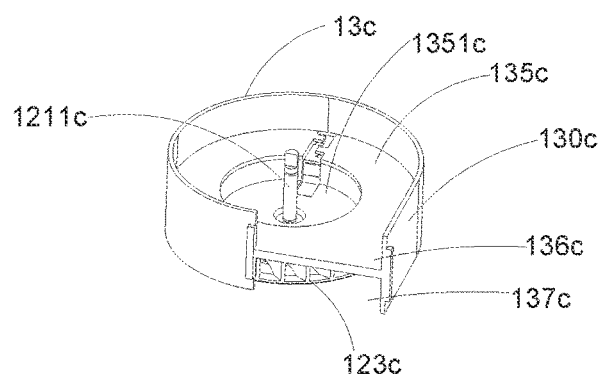
FIG. 13 is a schematic diagram of the partial structure of the fan assembly according to the fourth embodiment.
Figure 14:
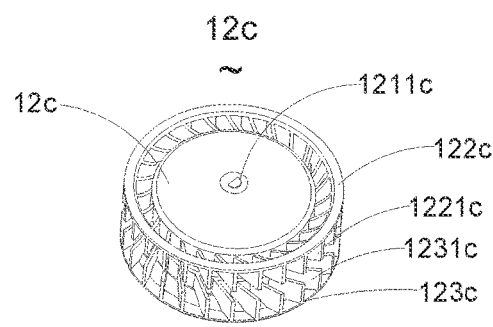
FIG. 14 is a schematic diagram 1 of the overall structure of the fan of the fan assembly according to the fourth embodiment.
Figure 14A:
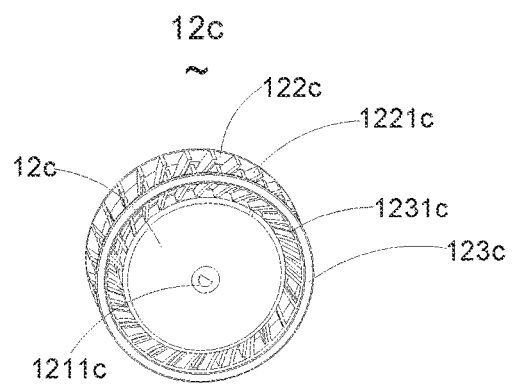
FIG. 14a is a schematic diagram 2 of the overall structure of the fan of the fan assembly according to the fourth embodiment.

Referring to FIG. 11b, a hair-removal apparatus 10b is provided, according to a third embodiment. The hair-removal apparatus 10b includes a housing 15b and a main body 11b accommodated in the housing 15b for hair removal and heat dissipation. The structure and principle of the main body 11b are the same as the main body 11 of the first embodiment. The main body 11b is accommodated in the housing 15b. The housing 15b includes a first housing 151b, a second housing 152b, and a third housing 153b. The first housing 151b is detachably connected to the third housing 153b, and the second housing 152b and the third housing 153b are detachably connected or integrally formed. An air-inlet hole 1522b for air intake and an air-outlet hole 1521b for air outlet are defined on the peripheral side of the second housing 152b, and an air-entering hole 16b for air intake is defined on the peripheral side of the first housing 151b. External air is sucked into via the air-inlet hole 1522b and the air-entering hole 16b simultaneously to dissipate heat from the heating mechanism in the main body 11b, thereby improving the air intake efficiency of the main body 11b. Subsequently, the main body 11b discharges hot air from the air-outlet hole 1521b out of the housing 15b to dissipate heat promptly.

Referring to FIG. 12 to FIG. 14a, a fan assembly c is provided, according to a fourth embodiment. The fan assembly c includes a fan housing 13c and a fan 12c. The fan housing 13c includes a fan casing 130c, and the fan 12c includes a first fan blade 122c, a second fan blade 123c and a motor 121c. A first air inlet 131c is provided on one side of the fan casing 130c, and a second air inlet 132c is provided on the opposite side of the first air inlet 131c. A first air outlet 133c and a second air outlet 134c are provided on the peripheral side of the fan casing 130c. The fan casing 130c is provided with an isolation plate mechanism 135c, and the first fan blade 122c and the second fan blade 123c are respectively disposed on opposite sides of the isolation plate mechanism 135c. One end of the motor 121c is connected to the first fan blade 122c, and the other end thereof is connected to the second fan blade 123c. The first air inlet 131c and the isolation plate mechanism 135c jointly define a first air chamber 136c, and the second air inlet 132c and the isolation plate mechanism 135c jointly define a second air chamber 137c. The first fan blade 122c is disposed in the first air chamber 136c, and the second fan blade 123c is disposed in the second air chamber 137c. Understandably, the first air chamber 136c and the second air chamber 137c are independent of each other, such that the rotation and air suction of the first fan blade 122c and the second fan blade 123c do not affect each other, thereby improving the suction efficiency. The first air outlet 133c is disposed corresponding to the first air chamber 136c, and the second air outlet 134c is disposed corresponding to the second air chamber 137c. The isolation plate mechanism 135c is provided with a motor-installing slot 1351c with the motor 121c disposed therein. Thus the installation space of the motor 121c is saved, the fan assembly c is smaller in size, and the space occupied by the main body 11 is saved. The motor 121c includes a shaft 1211c, one end of the shaft 1211c is connected to the first fan blade 122c, and the other end thereof is connected to the second fan blade 123c. The first fan blade 122c includes a plurality of first blades 1221c that are spirally distributed with the shaft 1211c as the axis. The second fan blade 123c includes a plurality of second blades 1231c that are spirally distributed with the shaft 1211c as the axis, and the orientation of the second blades 1231c is opposite to that of the first blades 1221c. When the shaft 1211c of the motor 121c rotates, the first fan blade 122c and the second fan blade 123c rotate in the same direction simultaneously. Since the first blade 1221c of the first fan blade 122c and the second blade 1231c of the second fan blade 123c face oppositely, the first fan blade 122c and the second fan blade 123c can also suck air simultaneously when they rotate in the same direction. Understandably, the first fan blade 122c and the second fan blade 123c, which are oppositely disposed with blades facing oppositely, enable the fan assembly c to achieve bidirectional air suction via one motor 121c and two fan blades. Compared with the traditional dual-motor and dual-blade fan solution for bidirectional suction, the structure of the present disclosure is simpler and the manufacturing cost is reduced. It is noted that the fan assembly c in this embodiment is also applicable to the main body 11 in other embodiments.

Understandably, in combination with the relevant contents in other embodiments, when the fan assembly c is applied to the main body 11, the refrigerating assembly 100 is disposed at the first air inlet 131c, and the heat-generating assembly 18 is in air circulation with the second air inlet 132c, the fan assembly c can simultaneously absorb external air and dissipate heat from the heat-generating assembly 18 and the refrigerating assembly 100. Further, external air passing through the refrigerating assembly 100 is sucked into the fan casing 130c from the first air inlet 131c and discharged from the first air outlet 133c, and external air passing through the heat-generating assembly 18 is sucked into the fan casing 130c from the second air inlet 132c and discharged from the second air outlet 134c to discharge hot air. In addition, since the first air chamber 136c and the second air chamber 137c are independent of each other, the air discharging of the first air outlet 133c and the second air outlet 134c is smoother, and the air outlet efficiency will not be affected by turbulent flow caused by the simultaneous air intake of the first air inlet 131c and the second air inlet 132c. More specifically, external air of room temperature is sucked into the first air chamber 136c from the first air inlet 131c after passing through the refrigerating assembly 100, so as to absorb external air and dissipate heat from the refrigerating assembly 100 disposed at the first air inlet 131c. The air-entering hole 141 disposed on the heat-dissipating housing 14, the air-guiding mechanism 134, and the second air inlet 132c disposed on the fan casing 130c are communicated sequentially, such that the air intake of the second air-inlet channel is smoother. And external air of room temperature passes through the heat-generating assembly 18 and is sucked into the second air chamber 137c from the second air inlet 132c to absorb external air and dissipate heat from the heat-generating assembly 18 in the air-passing chamber 19.

Optionally, the motor 121c is a dual-bearing brushless DC motor. Two bearings (not shown) are sleeved on the shaft 1211c of the motor 121c, one is disposed close to the first fan blade 122c, and the other is disposed close to the second fan blade 123c.

The invention claimed is:

1. A hair-removal apparatus comprising:
an apparatus housing;
a main body accommodated in said apparatus housing;
a first air-inlet channel; and
a second air-inlet channel;
wherein said main body comprises a heat-generating assembly and a refrigerating assembly, said heat-generating assembly comprises a lamp, said refrigerating assembly comprises a refrigerating sheet;
said first air-inlet channel and said second air-inlet channel respectively communicating said refrigerating assembly and said heat-generating assembly with ambiance to absorb external air and dissipate heat-;

wherein said main body further comprises a fan housing and a fan accommodated in said fan housing for air suction;

said fan housing further comprising a fan casing that defines a first air inlet on one side thereof, at least one second air inlet on the opposite side of said first air inlet and an air outlet on a peripheral side thereof;

said refrigerating assembly being disposed at said first air inlet, and said heat-generating assembly being in air circulation with said second air inlet;

said fan being disposed in said fan casing and rotating to suck air, external air being sucked into said fan casing from said first air inlet and said second air inlet respectively and discharged from said air outlet.

2. The hair-removal apparatus according to claim 1, wherein said main body further comprises a heat-dissipating housing;

an air-inlet hole being defined on said apparatus housing; said refrigerating assembly being disposed between said air-inlet hole and said fan housing; said first air-inlet channel being defined by said air-inlet hole, said refrigerating assembly and said fan housing jointly, whereby external air can be sucked into said fan housing via said first air-inlet channel to reduce the temperature of said refrigerating assembly;

at least one air-entering hole being defined on said heat-dissipating housing; an air-passing chamber, in which said heat-generating assembly is disposed, being defined by said fan housing and said heat-dissipating housing connected to said fan housing; said second air-inlet channel being defined by said air-entering hole, said heat-generating assembly and said fan housing jointly, whereby external air can be sucked into said fan housing via said second air-inlet channel to reduce the temperature of said heat-generating assembly.

3. The hair-removal apparatus according to claim 2, wherein said heat-generating assembly further comprises a reflective cup, said lamp is accommodated in said reflective cup;

said main body further comprising a heat-dissipating member that is disposed corresponding to said reflective cup.

4. The hair-removal apparatus according to claim 3, wherein said heat-dissipating member comprises at least two spaced sheet-like structures, and each two thereof defines a heat-dissipating gap.

5. The hair-removal apparatus according to claim 3, wherein said refrigerating assembly further comprises a heat-conducting member, a heat-conducting substrate and a heat-dissipating sheet assembly that comprises at least two heat-dissipating sheets; said heat-conducting substrate being positioned on said heat-dissipating housing and connected to said heat pipe, said heat-dissipating sheet assembly being disposed on said heat pipe, said refrigerating sheet being disposed in said heat-dissipating housing;

said main body further comprising a light-transmitting crystal for icing, said refrigerating sheet comprising a heat-generating surface in close contact with said heat-conducting substrate and a refrigerating surface connected to said light-transmitting crystal.

6. The hair-removal apparatus according to claim 5, wherein said apparatus housing comprises a first housing, a second housing and an annular housing; said first housing and said annular housing defining an air-inlet chamber, at least one air-entering hole that is disposed in said air-inlet chamber being defined on said heat-dissipating housing;

said first housing being clamped with said heat-dissipating housing, said annular housing being connected with said second housing, an air-entering gap for air inlet being defined between said first housing and said annular housing, said air-inlet chamber being communicated with said air-passing chamber via said air-entering hole; or, said first housing and/or said second housing defining an air-inlet through-hole that is communicated with said air-passing chamber via said air-entering hole, external air being sucked into said air-passing chamber through said air-inlet through-hole and said air-entering hole sequentially.

7. The hair-removal apparatus according to claim 2, wherein said fan casing further comprises a mounting plate with said second air inlet defined thereon.

8. The hair-removal apparatus according to claim 5, wherein said light-transmitting crystal is sapphire.

9. The hair-removal apparatus according to claim 6, wherein said air-inlet hole is correspondingly disposed at said first air inlet;

said second housing defining an air-outlet hole corresponding to said air outlet, external air sucked from said first air inlet and said air-entering hole being gathered in said fan casing and discharged from said air-outlet hole.

10. The hair-removal apparatus according to claim 2, wherein the cross-sectional area of said first air inlet is greater than or equal to that of said second air inlet.

11. The hair-removal apparatus according to claim 2, wherein said fan housing further comprises an air-guiding mechanism having a structure of both ends in communication with each other, a narrow middle and two wide ends.

12. The hair-removal apparatus according to claim 11, wherein one end of said air-guiding mechanism is communicated with said second air inlet, and the other end thereof is connected to said heat-dissipating housing to define said air-passing chamber.

13. The hair-removal apparatus according to claim 5, wherein said main body further comprises a filter lens and a light-shielding sheet, and said light-transmitting crystal, said filter lens, said light-shielding sheet, said heat-generating assembly and said heat-dissipating member are sequentially disposed in said heat-dissipating housing.

14. The hair-removal apparatus according to claim 13, wherein a sealing ring is disposed between said light-transmitting crystal and said filter lens to define a sealing cavity.

* * * * *